METHOD OF AND APPARATUS FOR HARVESTING VINE CROPS

Original Filed July 27, 1961 8 Sheets-Sheet 1

INVENTORS
OLIN L. LOOKER
EDWIN F. GREEDY

BY Hans G. Hoffmeister.
ATTORNEY

METHOD OF AND APPARATUS FOR HARVESTING VINE CROPS

Original Filed July 27, 1961 8 Sheets-Sheet 2

INVENTORS
OLIN L. LOOKER
EDWIN F. GREEDY
BY Hans G. Hoffmeister
ATTORNEY

METHOD OF AND APPARATUS FOR HARVESTING VINE CROPS

Original Filed July 27, 1961 8 Sheets-Sheet 3

INVENTORS
OLIN L. LOOKER
EDWIN F. GREEDY
BY Hans G. Hoffmeister.
ATTORNEY

METHOD OF AND APPARATUS FOR HARVESTING VINE CROPS

Original Filed July 27, 1961 8 Sheets-Sheet 4

INVENTORS
OLIN L. LOOKER
EDWIN F. GREEDY
BY Hans G. Hoffmeister
ATTORNEY

METHOD OF AND APPARATUS FOR HARVESTING VINE CROPS

Original Filed July 27, 1961 8 Sheets-Sheet 5

METHOD OF AND APPARATUS FOR HARVESTING VINE CROPS

Original Filed July 27, 1961 8 Sheets-Sheet 6

INVENTORS
OLIN L. LOOKER
EDWIN F. GREEDY
BY Hans G. Hofmeister
ATTORNEY

METHOD OF AND APPARATUS FOR HARVESTING VINE CROPS

Original Filed July 27, 1961 8 Sheets-Sheet 7

INVENTORS
OLIN L. LOOKER
EDWIN F. GREEDY

BY Hans G. Hoffmeister.
ATTORNEY

METHOD OF AND APPARATUS FOR HARVESTING VINE CROPS

Original Filed July 27, 1961 8 Sheets-Sheet 8

INVENTORS
OLIN L. LOOKER
EDWIN F. GREEDY
BY Hans G. Hoffmeister
ATTORNEY

United States Patent Office

Re. 27,528
Reissued Nov. 28, 1972

27,528

METHOD OF AND APPARATUS FOR HARVESTING VINE CROPS

Olin L. Looker, Stockland, and Edwin F. Greedy, Hoopeston, Ill., assignors to FMC Corporation, San Jose, Calif.

Original No. 3,301,331, dated Jan. 31, 1967, Ser. No. 415,633, Dec. 3, 1964, which is a continuation of Ser. No. 127,199, July 27, 1961. Application for reissue Dec. 2, 1970, Ser. No. 94,636

Int. Cl. A01d *17/04*

U.S. Cl. 171—1 26 Claims

Matter enclosed in heavy brackets [ ] appears in the original patent but forms no part of this reissue specification; matter printed in italics indicates the additions made by reissue.

The present application is a continuation of the copending application S.N. 127,199, filed July 27, 1961, now abandoned, and assigned to the same assignee as the present application.

This invention pertains to the harvesting of vine crops, and more particularly relates to a method of and apparatus for harvesting tomatoes and similar crops.

Vine crops, such as tomatoes, have heretofore been mechanically harvested principally by machines that engage the portions of the vine above ground, pull or cut the vines loose from its roots, and then separate the tomatoes from the vines. Such harvesters have not been altogether successful since the pulling action on the vines has damaged tomatoes, and no provision has been made for gathering tomatoes lying loose on the ground.

It is therefore an object of the present invention to provide a method of and apparatus for harvesting tomatoes and the like.

Another object is to provide a simple and effective mechanism for shaking fruit from vines.

Another object is to provide a novel drive mechanism for a harvester.

Another object is to provide an apparatus capable of gathering and automatically separating dirt, stones, loose and attached tomatoes, and vines from each other.

Other and further features and advantages of the present invention will become apparent from the following description taken in connection with the accompanying drawings, in which:

FIGURE 5A is an enlarged fragmentary section taken on line 5A—5A of FIGURE 5.

Figure 2:
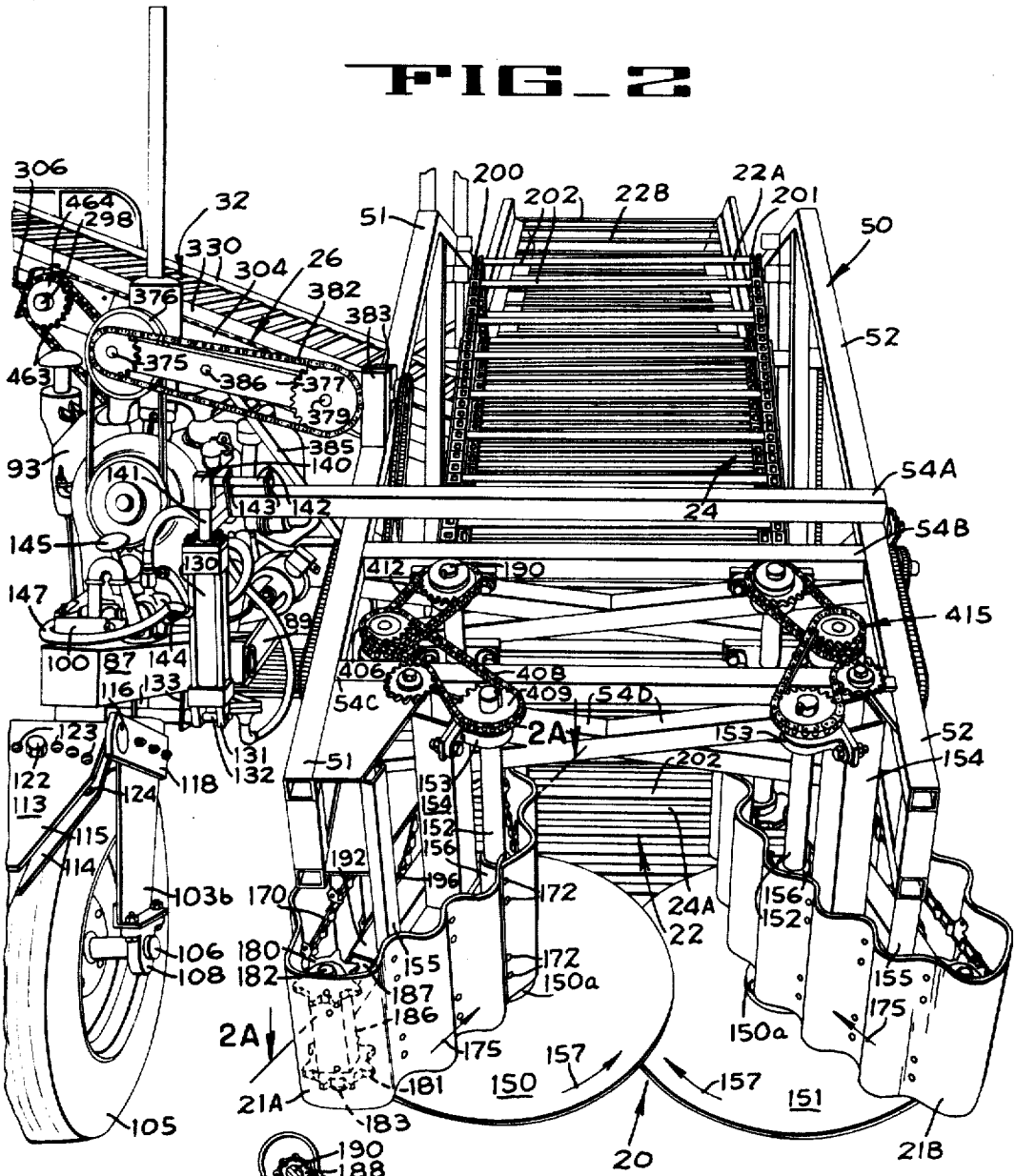
FIGURE 2 is a fragmentary diagrammatic perspective of the harvester looking at the forward end of the digging mechanism.
Figure 3:
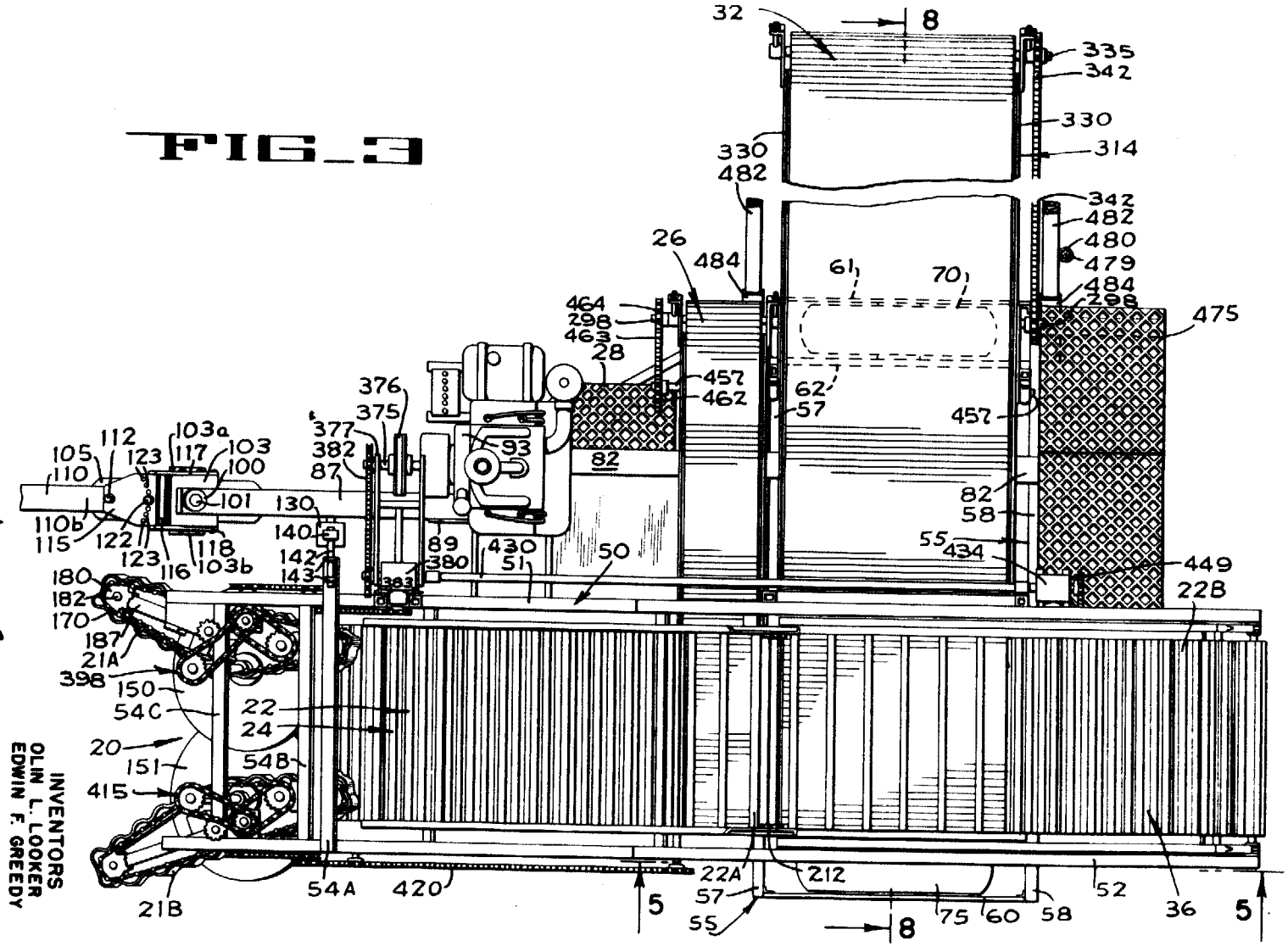
FIGURE 3 is a diagrammatic plan, with parts broken away, of the harvester of FIGURE 1.

The embodiment of the tomato harvester chosen to illustrate the present invention includes, in general, a disk-type digging mechanism 20 (FIGS. 1 and 2) which is arranged to remove tomatoes and vines from the ground and a pair of corrugated or fluted pick up belts 21A and 21B cooperate with the digging mechanism to convey the tomatoes and vines rearwardly to the lower end of an endless, bar-type elevating conveyor 22. As the vines, dirt, and tomatoes are carried upwardly, some dirt clods and loose ripe tomatoes tend to fall through the bar-type conveyor 22 but are supported by the upper run 24A of an endless drop-off conveyor 24 (FIG. 4) which underlies the upper run of conveyor 22. Dirt gravel and small objects will, of course, fall through both conveying surfaces and be separated from the vines at this point. When the upper end of the upper run 24A is reached, the dirt clods and loose tomatoes supported by conveyor 24 are dropped onto a lateral conveyor 26 which will be referred to hereinafter as the dirt conveyor and which, as seen in FIG. 3 carries the material past an inspection station 28 where the tomatoes may be removed by one of two inspectors located at this point, permitting the dirt clods to be discharged over the end of conveyor 26 onto the ground. Accordingly the three conveyors 22, 24, and 26 are effective to first separate dirt, gravel and small objects from the vine mass, and then separate dirt clods and loose tomatoes from the mass.

Figure 4:
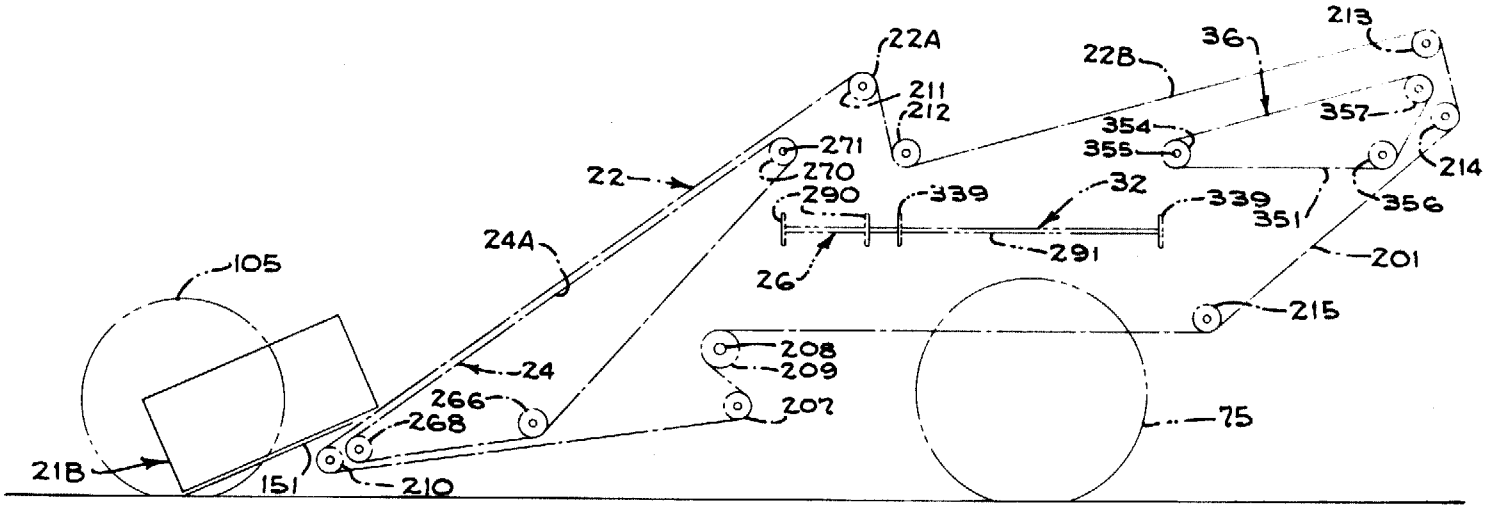
FIGURE 4 is a diagrammatic side elevation of the harvester, particularly showing the conveyor system of the harvester.
Figure 5:
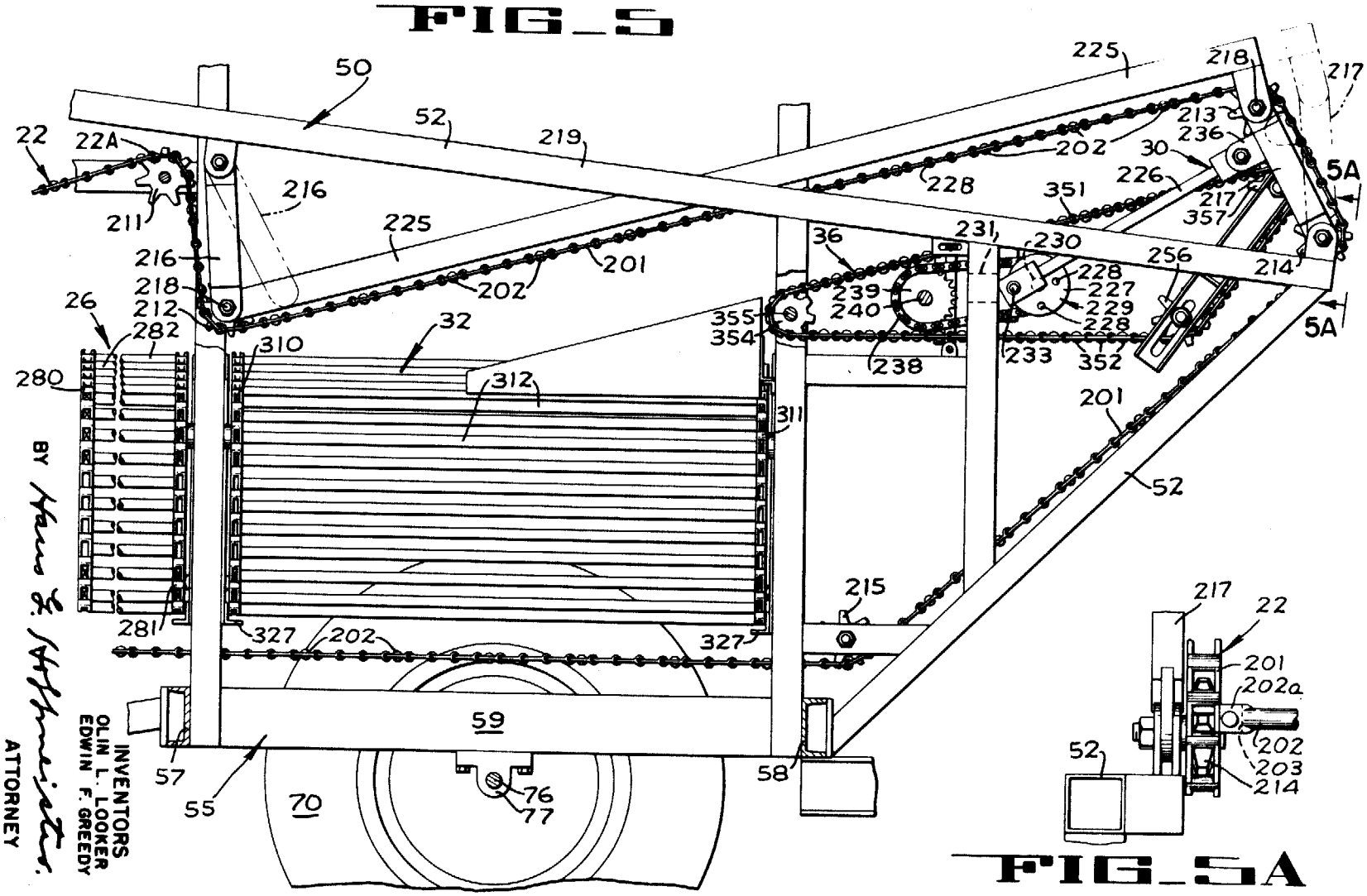
FIGURE 5 is an enlarged vertical section taken on line 5—5 of FIGURE 3.

The vines with tomatoes clinging thereto continue moving upwardly to a peak portion 22A (FIG. 4) of the vine conveyor 22 and are dripped down onto a shaker section 22B of the vine conveyor. This shaker section is continuously reciprocated back and forth in a direction longitudinally of machine by a drive mechanism 30 (FIG. 5). The reciprocating movement of the conveyor section 22B is such that the vines are bounced around haphazardly as they travel along. The agitation of the vines is of sufficient intensity to snap the stems of the tomatoes, causing the tomatoes to fall away from the vines and drop between the bars of the vine conveyor 22 onto a second transverse conveyor 32, hereinafter referred to as the tomato discharge conveyor, which transports the tomatoes laterally past inspectors standing on platforms 34A–34E (FIG. 6) disposed on opposite sides of the conveyor 32. The inspectors remove green tomatoes and fragments of vines, and permit the ripe tomatoes to be discharged into suitable receptacles for transportation to a cannery. Referring to FIG. 5, it will be noted that the tomato discharge conveyor 32 underlies only a portion of the shaker section 22B. Tomatoes, that are not dropped directly onto the sorting conveyor, are dropped onto an auxiliary endless, tomato return conveyor 36 which has an upper run movable downwardly toward the sorting conveyor to deliver the tomatoes onto that conveyor.

The depleted vines are carried upwardly over the end of the upper run of conveyor 22 and discharged onto the ground behind the forwardly moving machine.

MAIN SUPPORT STRUCTURE

Figure 1:
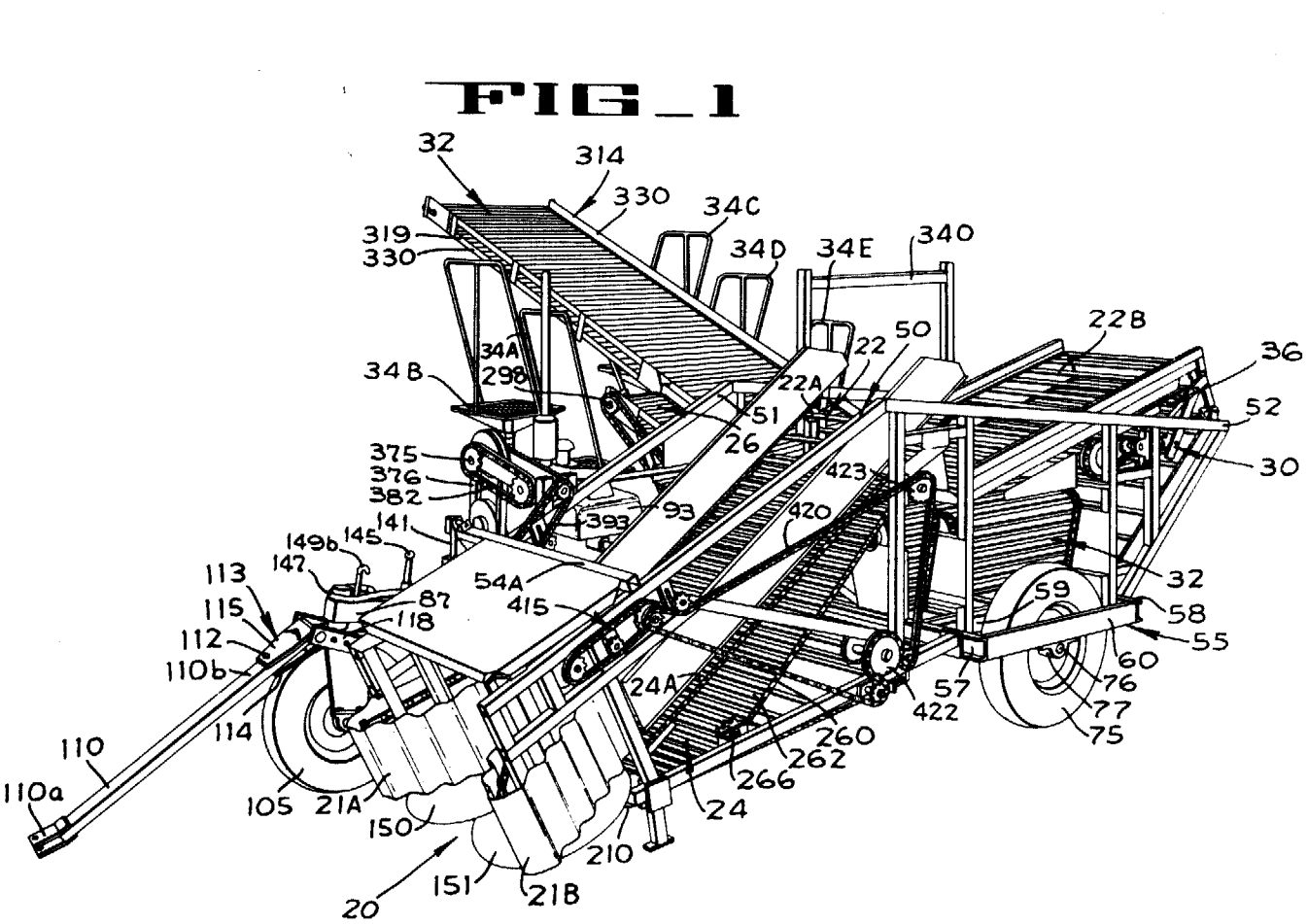
FIGURE 1 is a diagrammatic perspective, with parts broken away, of a harvester of the present invention.

The main support structure 50 (FIG. 2) of the machine comprises a pair of longitudinal side sections 51 and 52 which are substantially identical and are rigidly held together in laterally spaced relation by suitable transverse structural members including beams 54A, 54B, 54C, cross braces 54D, and a box-life frame 55 (FIG. 1). The frame 55 includes two spaced transversely extending channels 57 and 58 which are connected at one side of the machine by two spaced longitudinally extending members 59 and 60 and, at the other side of the machine, by two other spaced longitudinally extending members 61 and 62 (FIG. 3). The members of the frame 55 are suitably secured to each other, as by welding, to form a rigid unit, and are secured to the side frame sections 51 and 52 to rigidly interconnect these sections.

A rear traction wheel 70 is mounted on a short shaft 72 that is journalled in bearing units secured to the longitudinal members 61 and 62. Similarly, a second rear wheel 75 (FIG. 1) is mounted on a short shaft 76 that is journalled in bearing units 77 secured to longitudinal members 59 and 60.

At a point disposed inwardly of the rear wheel 70 (FIG. 6), a longitudinally extending box-beam 82 is welded to the upper surfaces of the box frame 55. The forward end 82a (FIG. 7) of the beam 82 has a transverse opening in which a sleeve 84 is welded, the sleeve having a journal portion 84a projecting laterally from the beam 82. A sleeve 86, that is welded to a front wheel support arm 87, is rotatably supported on the journal 84a, which also extends through a transverse opening in the wheel arm 87 and through a retaining plate 89. The wheel arm 87 and its sleeve 86 is held on the journal 84a by the retaining plate 89 which is removably secured, as by bolts (not shown) to a depending flange 92a of an engine mounting plate 92, that carires a gasoline engine 93 (FIG. 6) and is welded to the box beam 82.

Figures 6, 7:
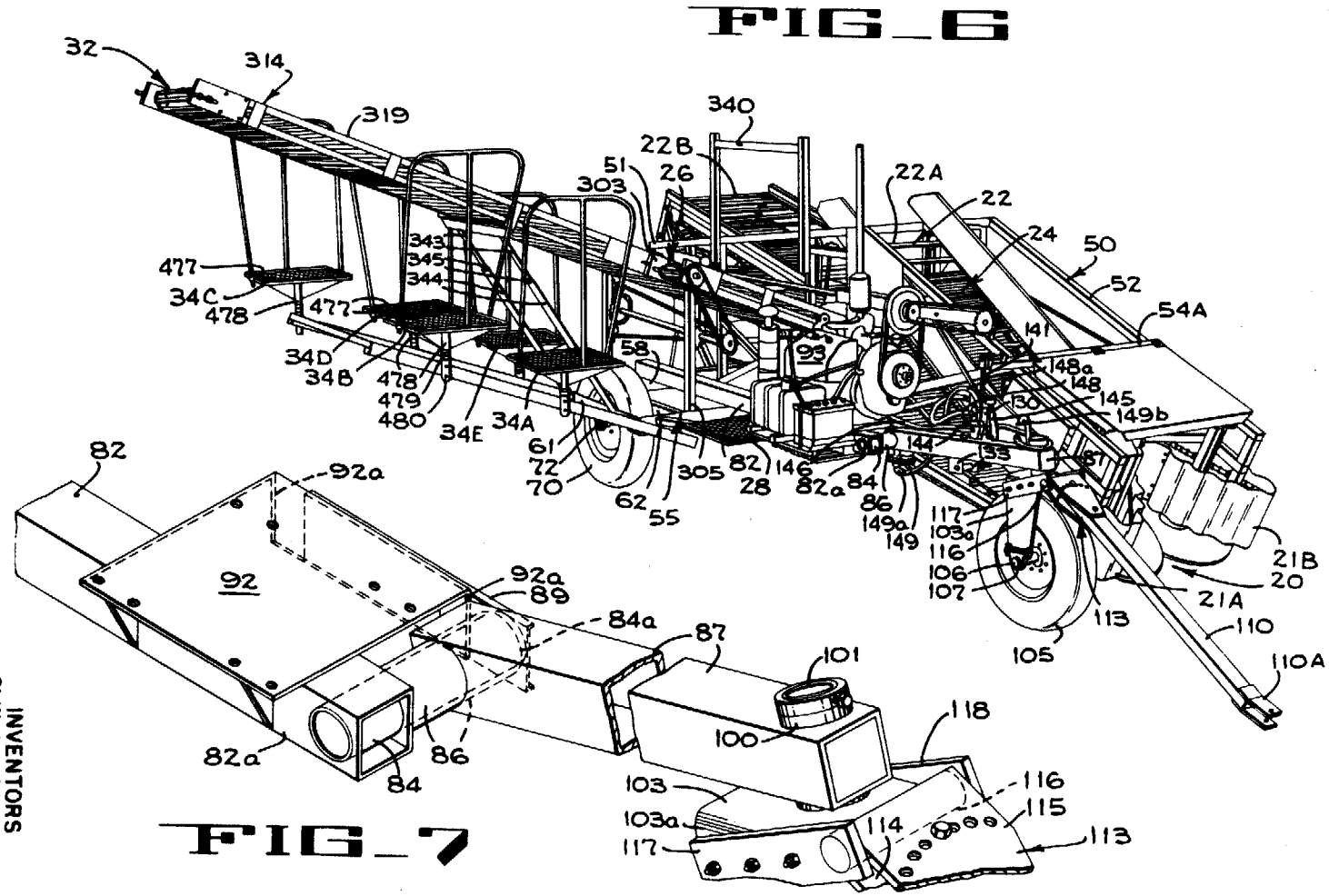
FIGURE 6 is a diagrammatic perspective of the harvester.
FIGURE 7 is an enlarged, fragmentary diagrammatic perspective of a portion of the harvester.

At its forward end, the wheel support arm 87, which is a hollow shaft that is square in cross-section, carries a vertically extending sleeve 100 which rotatably journals a vertical stub shaft 101 that is secured to and projects upwardly from a yoke 103. A front wheel 105 (FIG. 6) is mounted on an axle 106, which is journalled in a bearing 107 secured to the lower end of one leg 103a of the yoke and in a bearing 108 (FIG. 2) which is carried on the other leg 103b of the yoke. A draw bar 110 (FIG. 6) has a forward end 110a adapted to be secured to the towing tractor and a rear end 110b, which is pivotally connected by a bolt 112 to a bracket 113. The bracket 113 comprises two spaced plates 114 and 115 (FIG. 2) whose rear end portions are joined together by a rod 116 which is welded to both plates. As seen in FIGS. 6 and 2 the ends of the rod 116 are journalled in fixed arms 117 and 118 that are removably connected to the yoke legs 103a and 103b, respectively. The position of the draw bar 110 in the bracket 113 is determined by a removable, headed pin 112 (FIG. 2) which may be selectively positioned in any one of a plurality of holes 123 that are provided in the plate 115 on the arc of a circle that has the bolt 112 as center. The removable pin 122 extends through the plate 115, a hole (not shown) in the draw bar 110, and through a hole 124 in the lower plate 114, there being one hole 124 in plate 114 in alignment with each hole in the upper plate 115. The removable pin 122 makes it possible to change the angularity of the drawbar with respect to the harvester so that, if necessary, the alignment of the tractor and the rear wheels 70 and 75 of the harvesting machine may be varied to accommodate the vine rows. In setting up the equipment in the field, the harvester must first be aligned with the row of vines and then the tractor wheels must be arranged to pass between the rows. The detachable pin connection makes this adjustment possible.

The wheel support arm 87 is connected to the main frame by means of a hydraulic cylinder 130 (FIG. 2) which has spaced ears 131 at its lower end, that are pivotally mounted on a rod 132 which is rigidly supported by two ears 133 depending from the under side of the wheel support arm 87. A block 140 is fixed to the upper end of the piston rod 141 of the hydraulic cylinder, and the block pivotally engages a short rod 142 that is fixed to two ears 143 secured to and projecting upwardly from the fixed frame member 54A. Referring to FIG. 6, it will be evident that, since the power cylinder 130 is connected between the main frame and the wheel support arm 87, actuation of the cylinder will cause the machine to jack-knife about the axis of sleeve 86. The cylinder 130 will hold the main frame in any adjusted position and, accordingly, the position of the digging mechanism 20 relative to the ground can be selectively chosen and maintained.

The movements of the piston rod of cylinder 130 are controlled by a valve 144 which is actuated by a manually controlled lever 145. The valve has a neutral position, a position in which the piston in the cylinder is raised, and a position in which the piston is lowered. A hose 146 (FIG. 6) connects the valve to an oil pump embodied in the engine 93. A hose 147 connects the valve to the hollow wheel support arm 87 which is closed at its ends to form a fluid reservoir. A hose 148 (FIG. 6) extends from the valve to the upper end of the cylinder, and a hose 148a extends from the lower end of the cylinder to the valve. A hose 149 connects the oil pump to a filter 149a which is mounted on the wheel support arm 87 and is in flow communication with the reservoir. The reservoir is vented by pipe 149b.

DIGGING MECHANISM

Figure 2A:
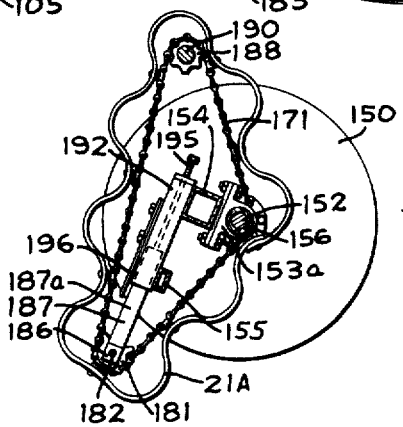
FIGURE 2A is a reduced diagrammatic section taken on line 2A—2A of FIGURE 2.

The digging mechanism 20 comprises two steel disks 150 and 151 (FIG. 2) each of which is attached to a hub 105a that is keyed to the lower end of the drive shaft 152. The shaft 152 is supported against vertical movement and for rotation about its longitudinal axis in an upper bearing 153 and a lower bearing 153a (FIG. 2A) that are held in fixed position relative to the frame by suitable structural members including rigid upright posts 154 and 155. A pair of wooden sleeves 156 (one only being shown) are set-screwed to each shaft 152. One sleeve being disposed below the lower bearing 153a and the other disposed above the bearing. The shafts 152 are rotated by a drive mechanism which will be described hereinafter.

The disks 150 and 151, which may be about 26 inches in diameter, are so arranged that their inner edges overlap and move rearwardly as indicated by arrows 157. The operating position of the forward edges of the disks is approximately one to two inches below the surface of the ground. This position enables the disks to sever the root system from the plant with a minimum disturbance of the attached tomatoes. It also assures that all loose fruit, which may be lying on the surface in the row prior to harvesting, will be gathered along with the vines and not left on the ground as a total loss. The harvesting of loose fruit in this manner is an important factor since the loose fruit on the ground often reaches proportions as high as 20% of the total crop. Another important advantage of dipping the disks into the ground results from the fact that a thin layer of soil is scooped up by the disks. This layer of dirt functions as a cushion and also as a traction medium in the conveying of the loose tomatoes. On one embodiment, the disks are tilted at approximately 25° from the horizontal. However, the disks will perform their function of severing and conveying within a range defined by a horizontal position and a position tilted approximately 35° to the horizontal.

PICK-UP BELTS

The two pick up belts 21A and 21B are identical but oppositely disposed accordingly, a description of belt 21A will serve to disclose the construction and operation of belt 21B also. The belt 21A is made of leather or any similar material that may be formed into a corrugated configuration having yieldable walls. Two endless chains 170 (FIG. 2) and 171 (FIG. 2A) are provided with special flanged links that are riveted to the inner face of the belt as spaced points, the portions of the belt between the riveted connections being greater in length than the associated length of chain between rivets so that the portions of the belt between riveted connections bulge outwardly to give the belt a corrugated configuration. One line 172 of the riveted joints not only secures the special links of the chains to the belt but also secures overlapped ends of the belt to each other to form the belt in an endless arrangement.

The inner walls of the belts 21A and 21B move rearwardly, as indicated by arrows 175, to push vines and dirt rearwardly over the disks 150 and 151 to the bar-type elevator conveyor 22.

The chains 170 and 171 of each belt are trained around sprockets 180 and 181, respectively (FIG. 2) that are rotatably journalled on stub shafts 182 and 183, respectively, which project from opposite ends of a cross member 186 of a T-shaped support arm 187. The chains are also directed over the spaced wooden sleeves 156 on shaft 152 and around spaced sprockets 188 (one only being shown in FIG. 2A) on a drive shaft 190 that is journalled for rotation in suitable bearings fixed in the main support structure of the machine.

The T-shaped support arm 187 is part of a chain take-up mechanism which includes a tube 192 that receives the shank 187a of the T-shaped arm and is welded to the fixed posts 154 and 155. The rear ends of the shank 187a and of the tube 192 are closed by fixed plates, and a screw 195 that is threaded through the end plate of tube 192 abuts the face of the end plate of shank 187a and determines the adjusted position of the shank in the tube. Both the shank 187a and the tube 192 are square in cross-section, accordingly, no rotary movement between these members is possible. The drive mechanism for shaft 190 will be explained presently however, it will be evident that in operation the shaft 190 is rotated in the proper direction to cause the inner runs of belts 21A and 21B to move rearwardly over the disks 150 and 151.

A scraper blade 196 (FIG. 2A) is mounted on the outer side of each tube 192 so that its lower edge is close above the associated disk 150 or 151. Thus, if dirt or other material clings to the upper surface of the disk, it will be intercepted by the scraper and guided outwardly off the side of the disk.

CONVEYING SYSTEM

The vine conveyor 22 comprises two spaced endless chains 200 and 201 (FIG. 2) which are connected by a plurality of transverse bars 202. As seen in FIG. 5A, each conveyor bar 202 is a tubular member that has flattened ends 202a (one only being shown). Each flattened end is riveted to a tab 203 formed on a link of the chain to which the end is connected.

Each of the two chains 200 and 201 is trained around an identical series of drive and idler sprockets. Referring to FIG. 4 which illustrates chain 201 and its associated sprockets, it will be noted each chain is driven by a sprocket 209 keyed to a horizontal transverse shaft 208 which is journalled for rotation in bearings in the main support structure. After passing around drive sprocket 209, the chain passes over an idler sprocket 207 which may be mounted on a conventional chain tensioning mechanism. At the forward end of the machine, the chain passes around guide roller 210 that has an outer flange, and then moves upwardly and rearwardly and is trained successively over idler sprockets 211, 212, 213, 214 and 215. It will be evident that, when shaft 208 is driven counterclockwise (FIG. 4), the lower run of the conveyor is moved forwardly and the upper, vine-conveying run of conveyor 22 is moved rearwardly to carry the vine mass away from the digging disks and the corrugated pick up belts. The flanged rollers 210 keep the conveying belt centered and provide smooth contact surfaces which eliminate the possibility that stones will dislodge the chains.

The stepped roller 210 and sprockets 211, 214 and 215 are rotatably supported on studs projecting laterally from the side sections 51 and 52 of the main frame. However, the idlers 212 and 213 (FIG. 5) are rotatably mounted on studs 218 carried by the outer ends of levers 216 and 217, respectively. The levers 216 and 217 are pivoted at their inner ends on a fixed rail 219 of the associated frame side section. A rigid bar 225 is pivotally connected to each of the studs 218 alongside the sprockets 212 and 213. As previously mentioned, the section of the conveyor 22 between sprockets 211 and 214 is a shaker section wherein the run of the conveyor is inclined at about 15° to the horizontal and is reciprocated longitudinally of the machine to agitate the vines and cause the tomatoes to be separated from the vines. The reciprocation of the shaker section is carried out by the drive mechanism 30 which includes two identical crank mechanisms 229 (one only being shown in FIG. 5). Each crank mechanism is disposed closely adjacent one of the side frame sections 51 or 52 and has a connecting rod 226 (FIG. 5) disposed approximately in the vertical plane of the idler sprockets at that side of the machine. The crank mechanisms are identical, and accordingly, only the mechanism associated with side frame section 52 (FIG. 5) will be described in detail. Each crank mechanism comprises a crank disk 227 which has four holes 228 (two only shown) drilled therethrough at different radial distances from a shaft 230. The shaft 230 extends transversely between the side frame sections 51 and 52 and is journalled for rotation in bearings carried by a transverse beam 231 of the main frame. The connecting rod 226 is pivotally connected to the crank disk 227 by a shouldered stud 233 that may be selectively secured in any one of the four holes of the crank disk. It will be apparent that the throw of the connecting rod and the amount of reciprocating movement of the shaker section may be varied by selectively positioning the pivot stud in the different holes of the crank disk. At its other end, the connecting rod 226 is pivotally connected to a short arm 236 formed on lever 217. The shaft 230 is driven by an endless chain 238 that is trained around a sprocket 237 (FIG. 9), that is secured to shaft 230, and around a sprocket 239 keyed to a transverse drive shaft 240. The drive mechanism for shaft 240 will be described hereinafter in connection with the drive train of the entire machine. In general, when shaft 240 is rotated, the two crank mechanisms 229, operating in unison, swing the lever arms 217 at each side of the machine through an arcuate path about the axes of sprockets 213. Oscillating movement of the levers 217 causes reciprocating movement of the two bars 225 and oscillation of the lever arms 216. Since the conveyor chain is trained around sprockets carried by the oscillating lever arms, the shaker section of the conveyor run will be reciprocated longitudinally of the machine. It is to be particularly noted that, during this reciprocating movement of the shaker section, the conveyor chain continues to move rearwardly. Accordingly, while the vines are being agitated, they are also conveyed rearwardly to the discharge end of the vine conveyor 22. The transverse bars of the vine conveyor are spaced apart a distance sufficient to permit all the tomatoes, that are shaken from the vines, to fall through the space between the bars. It has been found that a spacing of approximately five inches between bars is satisfactory for this purpose.

Figures 8, 9:
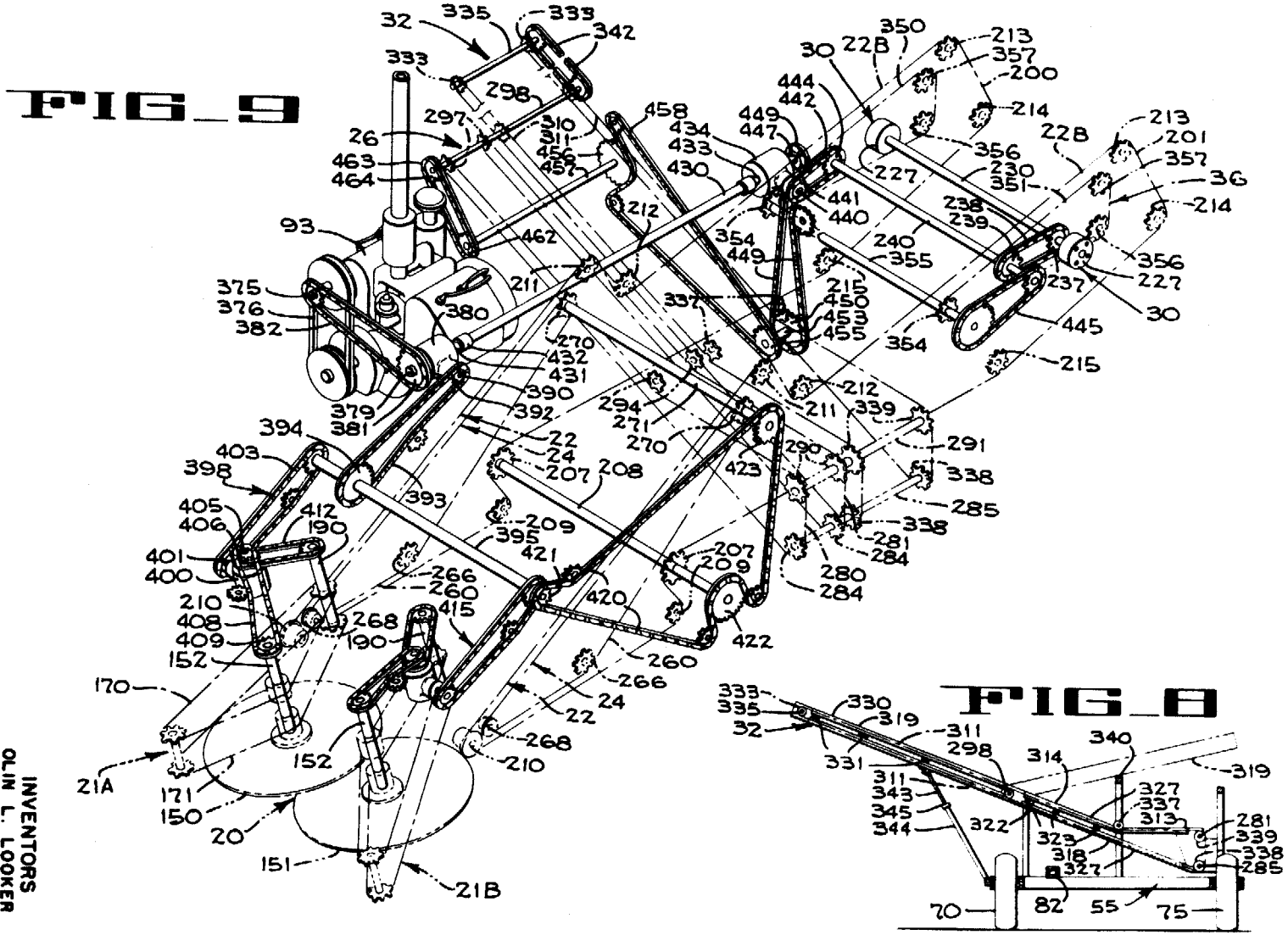
FIGURE 8 is a reduced diagrammatic section taken on line 8—8 of FIGURE 3.
FIGURE 9 is a schematic perspective of the drive mechanism of the harvester of FIGURE 1.

In regard to the extent and speed of the shaking action, a satisfactory tomato-separating shaking action is obtained if the shaker stroke is approximately four inches and the frequency of the shaking action is approximately 200 cycles per minute. However, variation in field conditions occur due to differences in plant variety, temperature, level of maturity, humidity, and plant diseases. Therefore, the four holes 228 in the crank disks 227 provide for shaker strokes of three, three and one-half, four, and four and one-half inches. In FIG. 9, the chain 238 is shown disposed around one particular pair of sprockets for driving the shaft 230 from shaft 240. However, it has been found advantageous to provide three other pairs of sprockets (not shown) around which the chain may be selectively trained so that, in all, four shaker frequencies of 180, 200, 220, and 240 cycles per minute may be obtained.

It is to be noted that the illustrated embodiment provides a certain positional relationship between the sprockets 211–214; that is, the axes of all of the sprockets 207, 209–215 are intersected by an imaginary closed curve and the axes of sprockets 211 and 214 are intersected by an imaginary straight line, said curve and line serving as references. Said positional relationship is such that the auxiliary, movable inner sprockets 212 and 213 are between said main, guiding outer sprockets 211 and 214, with respect to said curve, and such that these inner sprockets are on opposite sides of said line. Although this relationship is very satisfactory, other relationships may be employed to achieve reciprocation of the shaker section 22B of the vine conveyor 22.

Figure 10:
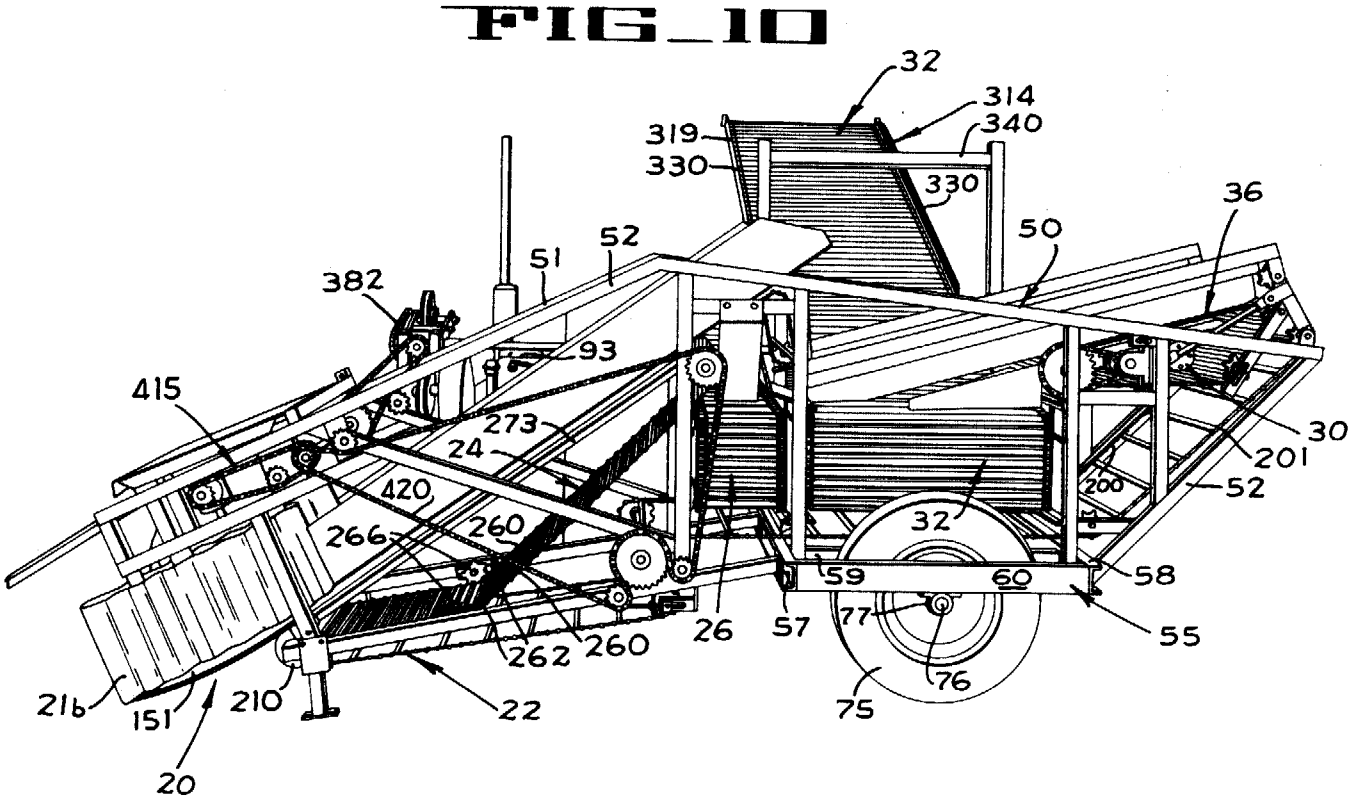
FIGURE 10 is a diagrammatic side elevation of the harvester.

The drop-off conveyor 24 is of the same general construction as the vine conveyor 22 and comprises two endless chains 260 (one only being shown in FIG. 1) that are connected by transverse steel tubes 262. The ends of the tubes are flattened or collapsed for attachment to the chains. Each chain is trained around an idler sprocket 266 (FIG. 4) that is mounted in a conventional chain tightening mechanism (not shown) which is secured to the main support structure. Near its forward end, each chain is trained over a guide roller 268 that has a flange on its outer side and is mounted on a fixed stud or the like projecting from the side frame section. The chain is driven by a sprocket 270 that is secured to a transverse power shaft 271. When the shaft is rotated clockwise (FIG. 4) the upper run of the drop-off conveyor moves upwardly and rearwardly. Suitable guide straps 273 (FIG. 10) are provided to support the upper runs of the two chains 260 and hold them close to the upper flight of the vine conveyor 22. With this arrangement, the drop-off conveyor 24 assists the vine conveyor in carrying the load of vines, tomatoes, and foreign matter. The distance between the centers of the tubes 252 is about one inch so that gravel and small objects are permitted to fall through while loose tomatoes and large stones are prevented from falling through.

The transverse dirt conveyor 26 is similar in construction to the drop-off conveyor 24 and comprises two spaced endless chains 280 and 281 (FIG. 5) connected by cross tubes 282. Each chain is trained around an idler sprocket 284 rotatably mounted on a shaft 285 that is mounted in the machine alongside the side frame section 52. From sprocket 284, each chain passes upwardly over an idler sprocket 290 that is rotatable on a second longitudinal shaft 291 which is mounted immediately above shaft 285. Each chain is also trained under an idler sprocket 294 (FIG. 9) rotatably mounted on a suitable stub shaft projecting from the adjacent side frame section 51 and around a drive sprocket 297 that is secured to a shaft 298 carried at the upper end of the conveyor. As seen in FIG. 6, the portion of conveyor 26, that projects laterally from the main conveyor, is inclined upwardly and is formed by two rigid side frame members 303 and 304 which are supported from the main support structure by suitable means including a vertical post 305. The previously mentioned shaft 298 extends through the side members 303 and 304 and is journalled in a chain-take-up mechanism 306 (FIG. 2). The side rails of the side frame members extend above the conveying surface to provide side guide rails which prevent material from dropping off the sides of the conveyor.

The tomato discharge conveyor 32 comprises two endless chains 310 an 311 (FIG. 5) connected by transverse tubes 312 which have flattened ends for connection to the chains. As seen in FIG. 8, the upper run of the conveyor 32 has a horizontally disposed section 313 underlying the shaker section of conveyor 22 and an upwardly inclined section 314 that carries the tomatoes to an elevated discharge end. The conveyor flights are guided in a frame which is made up of two parts, fixed lower section 318 (FIG. 8) and an upper section 319 that is hinged on the lower section by means of shaft 298. The lower frame section 318 includes two identical side (frames 322 (one only being shown) that are secured together by transverse rods 323 and are suitably secured to the main support structure. Each side frame includes angle members 327 that have inwardly projecting ledges which provide support surfaces for the conveyor chains. The upper frame section 319 comprises two identical side frames 330 that are connected by cross members 331. The side frames project upwardly above the side edge of the conveying surface to guide the tomatoes as they are elevated. Each of the chains is trained around a sprocket 333 (FIG. 9) that is secured to a drive shaft 335 that is journalled for rotation at the upper end of the side frame members 330. Also each chain engages an idler sprocket 337 that is rotatable on a suitable stub shaft (not shown), an idler sprocket 338 on shaft 285, and an idler sprocket 339 on shaft 291. The drive shaft 335 is driven by shaft 298 by means of a chain and sprocket drive 342 which is carried by one of the side frame members 330. The distance between the bars of conveyor 32 is such that tomatoes cannot fall through this space.

As seen in FIG. 8, the upper section 319 of the conveyor can be pivoted clockwise about shaft 298 to overlie the vine conveyor 22 and rest on a support structure 340. In this pivoted position, the harvestor can be towed along a highway or the like without presenting any obstructions to other traffic. A pair of rods 343 are pivotally connected to a cross-brace of the upper conveyor section 319, and a pair of tubes 344 are pivotally mounted on the main support structure. When the upper section 319 is swung to a position of alignment with the lower section 318, the rods 343 are telescoped into the tubes 344, and collars 345 on the rods abut the upper ends of the tubes to hold the upper section in the desired position.

The tomato return conveyor 36 is similar in construction to the other conveyors and comprises two chains 350 and 351 (FIG. 9) connected by transverse steel tubular bars 352 (FIG. 5) having flattened end portions. The chains are trained around drive sprockets 354, secured on a transverse drive shaft 355, and around idler sprockets 356 and 357. The idler sprockets may be carried on studs projecting from the main support structure or may be carried in suitable chain tighteners. It will be evident that when shaft 355 is rotated counterclockwise, tomatoes on the upper run of the conveyor 36 will be carried downwardly and dumped onto the tomato discharge conveyor 32.

DRIVE MECHANISM

The engine 93 (FIG. 9) drives a shaft 375 through a belt and pulley mechanism 376. The shaft 375 is journalled for rotation in the outer end of a support frame 377 (FIGS. 2 and 3) that is pivotally mounted at its inner end on a shaft 379 of a gear box 380. The shaft 375 drives a sprocket 381 keyed on shaft 379 by means of a chain 382. The gear box is bolted to structural members 383 that are welded to side frame 51. An angularly disposed brace 385 (FIG. 2) is secured to a rod 386 of frame 377 and to the frame 51 to rigidly support the frame 377 in a generally horizontal position. A shaft 390 (FIG. 9) projecting from gear box 380 has a sprocket 392 secured thereto for driving, by means of a chain 393 and a sprocket 394, a countershaft 395 which extends transversely over conveyor 22 and is suitably journalled for rotation in the main support structure.

Adjacent one end the countershaft 395 is connected to a drive mechanism 398 which is effective to cause rotation of disk 150 and movement of the chains 170 and 171 of the pick up bell 21A. The drive mechanism 398 includes a gear box 400 which has a shaft 401 that is driven from countershaft 395 by a chain 403 that is trained around sprockets keyed to shafts 395 and 401. A drive shaft 405, which extends upwardly from the gear box 400, has a double sprocket 406 secured thereto. The upper member of sprocket 406 drives the disk drive shaft 152 by means of a chain 408 that is trained around a sprocket 409 keyed to shaft 152. The lower member of double sprocket 406 is connected to the pick up belt drive shaft 190 by means of a chain 412.

Adjacent its other end, the countershaft 395 is connected to a drive mechanism 415 that is identical to the above-mentioned drive 398 but is so arranged that, whereas drive 398 causes the drive shaft 152 of disk 150 to rotate counterclockwise and the drive shaft 190 of pick up belt 21A to rotate counterclockwise, the drive 415 causes the drive shaft 152 of disk 151 to rotate clockwise and the drive shaft 190 of pick up belt 21B to rotate clockwise.

The countershaft 395 also drives the power shaft 208 of the vine conveyor 22 and the power shaft 271 of the drop-off conveyor 24 by means of a chain 420 which is trained around a sprocket 421 keyed to countershaft 395, a sprocket 422 keyed to power shaft 208, and a sprocket 423 keyed to shaft 271. It will be understood that shaft 208 is rotated counterclockwise (FIG. 9) while shaft 271 is rotated clockwise.

A second countershaft 430 is coupled at one end to a drive shaft 431 of gear box 380 by a coupling 432. At the other end, the countershaft 430 is coupled to a shaft 433 of a gear box 434. A shaft 440, projecting at right angles from gear box 434, has a sprocket 441 secured thereon which drives the shaft 240 by means of a chain 442 trained around sprocket 441 and around a sprocket 444 keyed to shaft 240. As previously mentioned, shaft 240 drives the shaft 230 on which the two crank disks 227 are secured. The shaft 240 also drives the drive shaft 355 of the return conveyor 36 by means of a chain and sprocket drive 445.

A shaft 447, projecting from one end of gear box 434, carries a sprocket around which a chain 449 is trained. This chain 449 is also trained over a sprocket 450 secured to a shaft 453 which is journalled for rotation in the frame. A sprocket 455, keyed to shaft 453, drives a sprocket 456, that is secured to a rotatable shaft 457 by means of a chain 458 trained over both sprockets. The shaft 457 extends under the tomato discharge conveyor 32 and under the dirt conveyor 26. A sprocket 462 secured on the shaft 457 is connected by a chain 463 to a sprocket 464 that is secured to the shaft 298. As previously mentioned, the shaft 298 drives the dirt conveyor 26 directly and drives the tomato discharge conveyor 32 by means of sprocket and chain drive mechanism 342.

From the foregoing description it will be evident that all the mechanisms of the machine are driven by the engine 93 and that, by properly choosing the size of sprockets and gear boxes, the desired speeds of the various mechanisms can be obtained.

Referring to FIGS. 3 and 6, it will be noted that the machine has provision for eight sorters. Two sorters are positioned at station 28, one sorter on each of the five platforms 34A–34E, and one sorter on a platform 475 (FIG. 3). It is to be particularly noted that the operator on platform 34A can sort material moving along the tomato discharge conveyor 32 or material moving along the dirt conveyor 24 merely by turning his body 90 degrees. Thus the positioning of the platform 34A adjacent the end of conveyor 24 and alongside conveyor 32 makes it possible for one sorter to perform two sorting jobs.

Each of the platforms 34A–34E is constructed of expanded steel welded to a suitable frame 477. At its lower side, the frame 477 is provided with a hollow hub 478 that fits over a pin 479 which is pressed in and projects upwardly from a cylindrical boss 480 welded to a rectangular frame 482. The frame 482 is made of square tubing with suitable cross bracing, and it is supported from the main support structure by means of two tubular sockets 484 (FIG. 3) which are welded on the main support structure and receive the lower ends of the side tubular members of the frame in telescoped relation.

To set up the harvester for operation in the field, it is necessary to first make the necessary adjustment in the angularity of the drawbar 110, by selectively positioning the pin 122 in one of the holes 123 in the bracket 113, so that the disks of the harvester are aligned with the row and the tractor wheels pass between the rows. Next, the disks are lowered to a position in which their forward edges are slightly under the surface of the ground. This adjustment is made by manipulating lever 145 to actuate the hydraulic cylinder 130.

With the disks in proper position and the conveyors all operating, the harvester is towed along the vine row. The disks, operating below the surface of the ground, sever the root system of the plant with a minimum of disturbance to the attached tomatoes. The disks also cut off a thin layer of top soil and convey rearwardly the vines, the layer of soil, and any loose tomatoes lying on the ground in the path of forward movement of the disks. The dirt layer functions as a cushion for the tomatoes and as a traction medium in the conveying of the loose tomatoes. As the vines, dirt, loose tomatoes, and stones are scooped up and moved rearwardly by the disks, the fluted belts compact the vines and draw them rearwardly.

On the initial part of the vine conveyor 22, dirt, gravel and small objects fall through the conveyors 22 and 24 onto the ground thus causing a first separating action. Since the bars of the vine conveyor are spaced apart a distance sufficient to permit tomatoes to pass therethrough, loose tomatoes and dirt clods will pass through the upper run of conveyor 22 and rest on the closely spaced bars of the upper run of the drop-off conveyor 24 which is disposed close beneath the upper run of conveyor 22. When the upper end of the drop-off conveyor is reached, these loose tomatoes and clods drop onto the dirt conveyor 26, completing the second separating operation. The tomatoes and dirt are further screened as they are carried to the upper end of the dirt conveyor. Any ripe tomatoes are removed and placed on the tomato discharge conveyor by one of the two sorters at station 28.

At this stage, the separation of the vines and foreign matter is completed, and the vines enter the shaking area with only attached tomatoes, both green and ripe. During the shaking, tomatoes drop directly onto the tomato discharge conveyor 32, or onto the return conveyor 36 which deposits them onto conveyor 32. The depleted vines are carried to the end of vine conveyor 22 and discharged onto the ground. The tomatoes on discharge conveyor 32 are carried between the two rows of sorters who remove green tomatoes and broken vine pieces and permit the ripe tomatoes to pass to the end of the conveyor 32 where they are received in a suitable container for transportation to the cannery.

From the foregoing description, it will be apparent that the present invention provides a method of and apparatus for harvesting tomatoes whereby not only the vines but also the loose tomatoes are gathered up and sorted. The unique mounting of a portion of the vine conveyor for reciprocating movement makes possible the efficient shaking of the vines during continuous movement thereof without the use of complicated shaking mechanisms. Further, the conveyor arrangement whereby small objects are separated from the vine mass first, then loose tomatoes and dirt clods, and finally the attached tomatoes, provides a novel, unique conveying system that carries out an efficient harvesting action.

Having thus described the invention, what is claimed as new and for which the protection of Letters Patent is desired is:

[1. A method of harvesting a vine crop which includes vines growing in a row and fruit both loose on the ground around the vines and fruit attached to the vines comprising the steps of; severing vines underground and scooping up dirt, severed vines and their attached friut, as well as loose fruit lying on the ground, whereby severed vines, attached fruit and loose fruit constitute a mass of scooped-up material, conveying said mass through a separating stage where loose fruit and dirt are separated from said mass, and shaking said vines subsequently to said separating stage thereby separating said attached fruit from the vines, said loose fruit being separated from said mass before said shaking step so as not to subject said loose fruit to said shaking step.]

[2. A method of harvesting tomatoes and similar crops including vines growing in a row above the ground, tomatoes loose on the surface of the ground around the vines, and tomatoes attached to the vines above the ground, comprising the steps of substantially simultaneously removing vines with attached tomatoes from the ground and collecting a mass including the removed vines and their attached tomatoes as well as said loose tomatoes lying on the ground; conveying said mass through a first separating stage; separating said loose tomatoes from said mass at the first stage; and separating said attached tomatoes from said mass at a second separating stage physically spaced from said first stage, the loose tomatoes separated from said mass at said first stage avoiding the separating action at said second stage.]

[3. A method of harvesting a vine crop which includes vines growing in a row, and fruit both loose on the ground around the vines and fruit attached to the vines comprising the steps of; separatnig growing vines from the ground and gathering the separated vines and their attached fruit as well as loose fruit lying on said ground, whereby vines, attached fruit and loose fruit constitute a mass; conveying said mass through a separating stage where loose fruit is separated from said mass; and shaking said vines subsequently to said stage so that the loose fruit that are separated from the mass are not subjected to said shaking step and so that said attached fruit are separated from said vines.]

[4. In a method of harvesting a vine crop including vines growing in a row, fruit attached to the portion of the vines above the surface of the ground and unattached fruit loose on the ground adjacent to the vines, certain of said gruit being relatively soft and readily subject to bruising, the steps of scooping up a layer of soil longitudinally of the row and including said portion of the vines in the row with said fruit attached to the said portion of the vines, and loose fruit around the vines, conveying the vines through predetermined separating stages spaced from each other, initially separating loose fruit from the vines in one of said stages, and vibrating the vines in another of said stages but only after said loose fruit is separated whereby bruising and other damage to the relatively soft loose fruit is minimized.]

[5. A method of harvesting a vine crop which includes vines growing in a row and the fruit both loose on the ground around the vines and attached to the vines, comprising the steps of; severing the roots of the vines from the vines in a row and gathering a mass including the severed vines, their attached fruit and loose fruit lying on the ground; conveying said mass through a first separating stage where loose fruit of the mass are separated from said mass; conveying the remaining mass, subsequent to the separation of said loose fruit, through a second separating stage where fruit attached to the vines is separated from said vines, said first and second stages being spaced from each other so that said loose fruit is not conveyed into said second stage; collecting and combining the loose and attached fruit which are separated from said mass; and discharging the separated vines onto the ground.]

[6. A method of harvesting a vine crop which includes upstanding vines growing in a row, and fruit both loose on the ground around the vines and fruit attached to the vines comprising the steps of; simultaneously severing underground the roots of the vines from the vines in a row and scooping up a layer of top soil including the severed vines and their attached fruit as well as loose fruit lying on said layer, whereby severed vines, attached fruit and loose fruit overlay said layer and constitute a mass, conveying said mass through a first separating stage where loose dirt is separated from said mass, conveying said mass through a second separating stage where loose fruit and dirt clods are separated from said mass, and shaking said vines subsequently to said second stage thereby separating said attached fruit from said vines, said loose fruit and dirt clod separation occurring in advance of said shaking step so that the loose fruit are not subjected to said shaking step and so that there is a minimum of dirt mixed in with the vines when they are subjected to the shaking step.]

7. A method of harvesting a vine crop which includes upstanding vines growing in a row and fruit both loose on the ground around the vines and attached to the vines comprising the steps of simultaneously severing the roots of the vines from the vines in a row and scooping up a layer of top soil in said row including the severed vines, their attached fruit, and loose fruit lying on said layer, whereby vines, loose fruit and attached fruit overlay said layer and constitute a mass, conveying said mass through a first separating stage where loose dirt of the layer is separated from said mass, conveying said mass through a second separating stage where loose fruit and dirt clods of the layer are separated from said mass, conveying the remaining mass through a third separating stage where fruit attached to the vines is separated from said vines, collecting and combining the loose and attached fruit which are separated from said mass substantially free of said dirt clods, and discharging the separated vines onto the ground, said loose fruit and dirt clods not being conveyed to said [second] *third* stage.

[8. A method of harvesting tomatoes connected to their vines and loose tomatoes on the ground around the vines comprising severing the vines from their root system at a point below the surface of the ground and simultaneously scooping up a mass including a layer of soil whereby loose tomatoes and severed vines bearing tomatoes are scooped up with and overlay said layer, said loose tomatoes and said severed vines bearing tomatoes being included in said mass, conveying said mass along a separating path which extends successively past first, second, and third separating stations, said stations being physically spaced from each other separating loose dirt from said conveyed mass at said first station, separating loose tomatoes and clods of dirt from said conveyed mass at said second station, separating attached tomatoes from their vines at said third station, said loose tomatoes and dirt clods not being subjected to the separating action which separates attached tomatoes from their vines, and discharging said vines onto the ground following passage through said third station.]

[9. In a method of harvesting a vine crop including vines growing in a row, relatively immature fruit attached to the portion of the vines above the surface of the ground and relatively mature fruit loose on the ground adjacent to the vines, certain of said mature fruit being relatively soft and readily subject to bruising, the steps of scooping up a layer of soil longitudinally of the row and including said portion of the vines in the row with said immature fruit attached to said portion of the vines, and loose fruit on the layer of soil around the vines, conveying the fruit and the vines on the soil layer through predetermined separating stages spaced from each other, initially separating loose fruit and dirt from the vines in one of said stages, and vigorously vibrating the vines in another of said stages after said loose fruit is separated thereby bruising and other damage to the relatively soft loose fruit is minimized and whereby said vines and dirt cushion the soft fruit until it is separated.]

[10. A continuous method of harvesting tomatoes, a portion of which are attached to vines growing in a row and a portion of which are loose on the ground around the vines comprising the steps of severing the vines from the roots; scooping up soil in said row, severed vines embedded in said soil, tomatoes attached to such severed vines, and loose tomatoes on said soil; conveying said vines and said tomatoes along a longitudinal path past first and second separating stations, said first station being spaced from and independent of said second station; separating loose tomatoes from said vines and attached tomatoes at said first station; and vibrating said vines and attached tomatoes longitudinally of said path as they are conveyed along said second station for separating said attached tomatoes from said vines, said loose tomatoes thereby being separated so as not to be subjected to vibration in said vibrating step.]

[11. A continuous method of harvesting tomatoes a portion of which are attached to vines growing in a row and a portion of which are loose on the ground around the vines comprising severing the vines from the roots; scooping up soil in said row, severed vines embedded in said soil, tomatoes attached to said severed vines, and loose tomatoes on said soil; conveying said soil, said vines, and said tomatoes along a longitudinal path which extends past first, second, and the third separating stations respectively spaced along said path, said second station lying between said first and third stations in non-overlapped relation therewith; separating loose soil from said vines and tomatoes at said first station; separating loose tomatoes and dirt clods from said vines and attached tomatoes at said second station; and vibrating said vines and attached tomatoes longitudinally of said path as they are conveyed through said third station for separating said attached tomatoes from said vines.]

12. A continuous method of harvesting tomatoes on vines growing in a row as well as loose tomatoes on the ground around the vines comprising the steps of simultaneously severing the roots of the vines and scooping of a layer of soil, vines embedded in said layer, tomatoes on the severed vines, and loose tomatoes on said layer all of which constitute material to be conveyed; conveying said material through first, second, and third separating stations arranged along a longitudinal path aligned with said row; separating loose dirt from said vines, tomatoes, and dirt clods at said first station; discharging said loose dirt onto the ground; separating loose tomatoes, dirt clods, and other foreign objects from said vines and attached tomatoes at said second station; discharging said dirt clods and foreign objects onto the ground, said loose tomatoes, dirt clods and other foreign objects being separated from said conveyed material before it is subjected to said vibrating step; vibrating said vines and attached tomatoes longitudinally of said path simultaneously with movement of said vines and attached tomatoes through said third station so as to separate said attached tomatoes from said vines while continuously advancing the conveyed material along said path; discharging vines from which tomatoes have been separated onto the ground; and collecting and combining said loose and attached tomatoes following separation of the latter from their vines.

[13. A machine for harvesting a vine row crop providing vines positioned in a row, fruit attached to the vines, and loose fruit on the ground around the vines, a support mounted for earth traversing movement longitudinally of the row of vines, means carried by said support for separating vines from the ground by engaging the vines at a point below the surface of the ground and for scooping up separated vines, fruit attached to the vines and loose fruit; means mounted in said support for conveying said vines and fruit in a predetermined path which extends past first and second separating stations and for separating the loose fruit from the vines with fruit attached thereto at said first station; and means positioned in said support below said path at said first separating station for receiving separated loose fruit, said conveying means including means at said second station for vibrating said vines and fruit attached thereto to shake said attached fruit from said vines, said separating means being spaced from said vibrating means so that said loose fruit is not subjected to said vibrating means.]

[14. A harvesting machine comprising a frame; means mounting the frame for earth traversing movement relative to vines and associated fruit; spaced first and second conveyors mounted on the frame; and vine and fruit handling means on the frame for gathering loose tomatoes and tomato vines and tomatoes attached to the vines from the ground, for dropping loose tomatoes onto the first conveyor, for shaking the vines and attached tomatoes to separate tomatoes from the vines, and for depositing said separated tomatoes onto the second conveyor, said handling means dropping said loose tomatoes without subjecting them to said shaking action.]

15. A machine for harvesting a vine row crop providing vines positioned in a row, fruit attached to the vines, and loose fruit on the ground around vines, a support mounted for earth traversing movement longitudinally of the row of vines, means carried by said support for severing vines from their root system at a point below the surface of the ground and for scooping up a layer of dirt longitudinally of and in said row and including severed vines in the layer, fruit attached to the vines, and loose fruit on the layer, means mounted in said support for conveying said scooped-up layer, vines, and fruit in a predetermined path which extends past first, second, and third separating stations in said support, means below said conveying means at said first station for separating dirt from said vines and fruit and at said second separating station for separating the loose fruit from the vines with fruit attached thereto, and means below said path at said second separating station for receiving separated loose fruit, said conveying means including means at said third station for vibrating said vines and fruit attached thereto longitudinally of said path to shake said attached fruit from said vines, said separating means separating said loose fruit before said loose fruit can reach said third station so that said loose fruit are not subjected to said vibrating means.

16. A machine for harvesting a vine crop including vines located in a row, fruit attached to the vines, and loose fruit on the ground around the vines, a mobile frame having forward and rearward portions and being mounted for forward earth traversing movement longitudinally of the row of vines to be harvested, scooping and conveying means carried by said frame having a lower earth penetrating portion adapted to sever underground the roots of the vines in the row and to scoop-up an elongated, substantially continuous mass of material into said frame and to convey said material along a predetermined path which extends through first, second, and third separating stations, said second station being located between said first and third stations in non-overlapped relation therewith, said mass of material including a layer of top soil longitudinally aligned with the row, vines rooted in said soil, fruit attached to said vines, and loose fruit lying on said layer, means mounted in said frame under said path at said first station and adjacent to said second station for separating dirt from said material during passage through said first station and separating loose fruit from the said material at said second station and before it reaches said third station, said conveying means including means for simultaneously shaking said vines and attached fruit longitudinally of their path of movement through said third station for separating said attached fruit from their vines, and means mounted in said frame for collecting fruit separated from said material.

17. In a machine for harvesting plants including vines and fruit thereof, a frame having front and rear portions and being mounted for forward earth traversing movement in a path of travel relative to the plants to be harvested; in elongated conveying means mounted in said frame in substantial alignment with said path of travel and providing a front receiving end portion for gathering plants onto said conveying means, said conveying means including a first conveying and separating section in longitudinal alignment with said path of travel for conveying vines and fruit rearwardly in said frame, said conveying means further including a second conveying and separating section aligned and being continuous with said first section and being supported for fore and aft reciprocating movement so as to shake the fruit loose from the plants and to discharge the loosened fruit downwardly therefrom, and a rear end portion for discharging vines from which fruit has been removed from said conveying means; and movable side members upstanding from said receiving end portion in spaced relation transversely of said conveyor and defining a rearwardly convergent passageway therebetween, said side members transversely confining and compacting said plants during their receipt into and travels through said passageway so that the mass of plants moving along said first and second sections have a transverse dimension commensurate with the transverse dimension of said first and second sections, said side members being resiliently yieldable outwardly of said passageway by the mass of plants moving along said passageway to preclude undue compression on and to avoid damage to fruit travelling through said passagewav.

18. A conveyor comprising a frame, an endless flexible conveying member having a portion adapted to be reciprocated longitudinally of said conveyor, means mounting said member in said frame for travel longitudinally of said conveying member and for longitudinal reciprocating movement of said portion, said means comprising a movable member supporting said portion of said endless member, and powered means borne by said frame and connected to said mounting means for simultaneously motivating said conveyor along said path and longitudinally reciprocating said portion and said movable member.

19. In combination, a support having front and rear portions; an endless separating conveyor mounted in said support including a lower return run having opposite front and rear ends, an upper run having a front portion connected to the front end of the return run and rearwardly upwardly inclined therefrom and an upper end, a rearwardly inclined rear portion having a lower end below the upper end of said front portion and an opposite upper end, and connecting portions respectively interconnecting the upper and lower ends of said front and rear portions and said upper and rear ends of said rear portion and return run, said connecting and rear portions of said upper run constituting a separating section supported for swinging movement forwardly and rearwardly in said support; and means connected to said separating section for imparting forward and rearward swinging movement thereto.

20. In combination, a support having front and rear portions; an endless separating conveyor mounted in said support including a lower return run having opposite front and rear ends, an upper run having a front portion connected to the front end of the return run and rearwardly upwardly inclined therefrom and an upper end, a rear portion having an end below the upper end of said front portion and an opposite end, and connecting portions respectively interconnecting the ends of said front and rear portions and said upper and rear ends of said rear portion and return run, said connecting and rear portions of said upper run constituting a separating section supported for swinging movement forwardly and rearwardly in said support; and means connected to said separating section for imparting forward and rearward swinging movement thereto.

21. In combination, a support having front and rear portions; an endless separating conveyor mounted in said support including a lower return run having opposite front and rear ends, an upper run having a front portion connected to the front end of the return run and rearwardly upwardly inclined therefrom and an upper end, a rearwardly inclined perforate rear portion having a lower end below the upper end of said front portion and an opposite upper end, and connecting portions respectively interconnecting the upper and lower ends of said front and rear portions and said upper and rear ends of said rear portion and return run, said connecting and rear portions of said upper run constituting a separating section supported for swinging movement forwardly and rearwardly in said support; means connected to said separating section for imparting forward and rearward swinging movement thereto, whereby material separated on said separating section drops therethrough; a discharge conveyor mounted in said support under said separating section and above said return run; and a return conveyor mounted in said support in spaced substantially parallel relation to and below said separating section of said separating conveyor and having a discharge end over said discharge conveyor for receiving material dropping through said separating section and for conveying said material onto said discharge conveyor.

22. In a conveyor, a frame, first and second arms having opposite upper and lower end portions, means on said frame connected to the upper end portion of said first arm and suspending said first arm for pivotal movement about a substantially horizontal axis, means on said frame connected to the lower end portion of said second arm and pivotally mounting said second arm for movement about an axis in spaced, substantially parallel relation to the pivot axis of said first arm, said second arm projecting upwardly from its pivot axis, means pivotally interconnecting said arms in fixed spaced relation to each other, a pair of outer rotary conveying members journalled in said frame individually adjacent to said axes of said arms, a pair of inner rotary conveying members respectively journalled on the lower and upper end portions of said first and second arms, the axes of rotation of said rotary conveying members being substantially parallel to each other and to the axes of said arms, an elongated endless flexible conveying member trained around said rotary conveying members, and means for imparting reciprocating pivotal movement to said arms whereby the portion of said flexible conveying member between said outer conveying members is reciprocated longitudinally of said flexible member.

23. A conveyor comprising a frame having forward and rearward portions, front and rear pairs of main sprockets rotatably mounted in said frame with corresponding pairs of said sprockets being on common substantially horizontal axes and with said common axes being in spaced parallel relation to each other, front and rear pairs of auxiliary sprockets, means borne by said frame mounting said auxiliary sprockets for unitary reciprocating movement in arcuate paths respectively below and above said front and rear pairs of main sprockets with corresponding pairs of auxiliary sprockets being rotatable on common axes and with the common axes of the auxiliary sprockets being substantially parallel to the common axis of the main sprockets, said main and auxiliary sprockets on corresponding sides of said conveyor being in common upright planes, and endless conveying member trained around said auxiliary sprocket and extending between said main sprockets, and powered means connected to said mounting means for reciprocating said mounting means and said auxiliary sprockets in said arcuate path thereby reciprocating the portions of said conveying member trained between said auxiliary sprockets.

24. A conveyor comprising a frame having forward and rearward portions; front and rear pairs of guiding sprockets rotatably mounted in said frame in upstanding planes with corresponding pairs of said sprockets being on common axes and with said common axes being in spaced parallel relation to each other, front and rear arms connected to said frame for pivoting movement about axes substantially parallel to the axis of said front guiding sprockets with said arms respectively projecting downwardly and upwardly from said front and rear pairs of guiding sprockets, a longitudinally rigid linkage pivotally interconnecting said front and rear arms for unitary fore and aft pivotal movement thereof, front and rear pairs of movable sprockets respectively rotatably mounted on said front and rear arms for rotation about axes substantially parallel to the axes of said guiding sprockets and with sprockets on corresponding sides of said conveyor being located in common upstanding planes, endless conveying chains individually trained about said sprockets in said common upstanding planes whereby portions of said chains between said guiding sprockets are guided for fore and aft movement with said movable sprockets, transverse conveyor elements interconnecting said chains with said elements being spaced longitudinally of said chains, and powered means borne by said frame having driving connection to said chains and to a rear arm for simultaneously motivating said chains longitudinally thereof and for reciprocating said portions of said chains fore and aft of said frame.

25. In a support; a conveyor including a plurality of main rotary conveyor members rotatably mounted in said support in a common plane with their axes in spaced substantially parallel relation to each other, a pair of auxiliary rotary conveyor members mounted on said support individually adjacent to said main conveyor members, in said common plane, and with their axes substantially parallel to the axes of said main members, means mounted on said support and interconnecting said auxiliary members for unitary reciprocating movement, and an endless conveyor member trained around said rotary members for circuitous travel in response to rotation of said main members, said endless member including a vibratory portion between said pair of main members and reciprocably movable with said auxiliary members; and powered means connected to said conveyor for simultaneously imparting reciprocating movement to said auxiliary members.

26. In a machine for harvesting vine crops, means for gathering the vines and lose fruit, conveying means for moving the loose fruit and the vines along a predetermined path, means for separating the gathered loose fruit from the vine, means for shaking the vines to loosen the fruit attached thereto, a first discharge conveyor arranged to receive the separated gathered loose fruit, a second discharge conveyor arranged below said shaking means for receiving the fruit loosened from the vines by said shaking means, said first and second discharge conveyors extending in generally parallel direction closely adjacent each other, said first discharge conveyor being longitudinally shorter than said second discharge conveyor and having an end portion adjacent an intermediate portion of said second discharge conveyor, and a worker's platform arranged to support a worker adjacent said end portion and said intermediate portion and within reach of fruit being conveyed on said first and second discharge conveyors.

27. In a harvester, a support structure, an elongate endless chain vine conveyor disposed upon said support structure and having an upper run movable in a predetermined path of travel, said vine conveyor including a plurality of spaced transverse vine supporting loose fruit passing bars, said upper run of said vine conveyor including a vine shaker section of predetermined length, discharge means disposed under an upstream portion of said vine shaker section to receive fruit shaken from said vines and to convey fruit received thereon in a path transversely of said conveyor path of travel, and a fruit return conveyor disposed under a downstream portion of said shaker section to receive fruit shaken from said vine and to direct fruit dropped thereon to said fruit discharge means.

[28. A method of harvesting a crop including fruit bearing portions, fruit loose on the ground, and fruit attached to the fruit bearing portions comprising the steps of collecting a mass including the fruit bearing portions and their attached fruit as well as loose fruit lying on the ground, conveying said mass through a first separating stage, separating the loose fruit from the mass at said first stage, and separating said attached fruit from the remaining mass subsequently to the separation of the loose fruit at said first stage, said separating of the loose fruit being effected in advance of separating of the attached fruit so that the loose fruit is not subjected to the separating action which the attached fruit is subjected to.]

29. A harvesting machine comprising a frame; means mounting the frame for earth traversing movement relative to plants having fruit bearing portions and fruit, there being certain fruit separated from the fruit bearing portions and lying loose on the ground and other fruit still attached to said fruit bearing portions, first and second fruit collecting means mounted on the frame in spaced relation to each other, [and] plant handling means on the frame for gathering loose fruit, *dirt* and fruit bearing portions with fruit attached thereto from the ground, for repositing loose fruit *and dirt* onto the first collecting means, for separating attached fruit from the fruit bearing portions after said loose fruit *and dirt* has been deposited, and for depositing said separated fruit onto the second collecting means, *a worker's platform associated with said first collecting means for enabling a worker to transfer selected fruit from said first collecting means to said second collecting means, a worker's platform associated with said second collecting means for enabling a worker to discard fruit on the latter, said first collecting means including conveyor means for discharging nonselected fruit and dirt to the ground.*

30. A method of harvesting a crop including fruit bearing portions, fruit loose on the ground, and fruit attached to the fruit bearing portions comprising the steps of collecting a mass including the fruit bearing portions and their attached fruit, loose fruit lying on the ground, and dirt; conveying said mass through a first separating stage; separating loose fruit and dirt from the mass at the first stage; separating attached fruit from the remaining mass subsequently to the separation of the loose fruit and dirt at the first stage; collecting the loose fruit and the dirt at one location and collecting the separated attached fruit at another location; separating the loose fruit from the dirt; and recombining the loose fruit and the separated attached fruit.

31. A method of harvesting a crop including fruit bearing portions, fruit loose on the ground, and fruit attached to the fruit bearing portions comprising the steps of collecting a mass including the fruit bearing portions and their attached fruit as well as loose fruit lying on the ground *and some dirt* conveying the mass toward a separating station at which said attached fruit will be removed from the bearing portions, removing said *loose* fruit *and dirt* from said mass before said mass reaches said separating station so that said loose fruit is not subjected to the separating action at said separating station, separating said attached fruit from said fruit bearing portions at said separating station, *selecting market fruit from previously removed loose fruit and dirt,* [and] recombining said loose fruit and said separated attached fruit free of said bearing portions *without including said nonselected loose fruit and said dirt, and discharging the nonselected loose fruit and dirt to the ground.*

32. The machine of claim 29 wherein at least a portion of said second collecting means is located along side of and adjacent to said first collecting means to facilitate transfer of loose fruit from said first collecting means to said portion of said second collecting means.

*33. A method of harvesting a vine crop which includes upstanding vines growing in a row and fruit both loose on the ground around the vines and attached to the vines comprising the steps of simultaneously severing the roots of the vines from the vines in a row and scooping up a layer of top soil in said row including the severed vines, their attached fruit, and loose fruit lying on said layer, whereby vines, loose fruit and attached fruit overlay said layer and constitute a mass, conveying said mass through a first separating stage where loose dirt of the layer is separated from said mass, conveying said mass through a second separating stage where loose fruit and dirt clods of the layer are separated from said mass, collecting the loose fruit and clods, conveying the remaining mass through a third separating stage where fruit attached to the vines is separated from said vines, selecting fruit from*

*the previously collected loose fruit and combining and collecting the selected loose fruit and the attached fruit which was separated from said mass substantially free of said dirt clods, directing and previously collected clods and unselected loose fruit to the ground and discharging the separated vines onto the ground, said loose fruit and dirt clods not being conveyed to said third stage.*

*34. A method of harvesting a crop such as tomatoes including fruit bearing portions above the ground, fruit loose on the ground, and fruit attached to the fruit bearing portions; said method comprising the steps of advancing along the crop and collecting a mass including the fruit bearing portions and their attached fruit, loose fruit lying on the ground, and dirt; conveying said mass through a loose material separating stage; separating loose fruit and dirt from the mass at said loose material separating stage and continuing to convey the remaining mass; separating attached fruit from the remaining mass after said separation of loose fruit and dirt from the mass; collecting on first conveyor means at one location the loose fruit and dirt separated at said loose material separating stage; collecting on second conveyor means at another location the attached fruit separated after the loose material separating stage; removing green fruit from the separated attached fruit traveling on said second conveyor means and discarding the green fruit while permitting the remainder of the separated attached fruit to travel to a final collection location; removing loose fruit from the loose material collected on said first conveyor means and transferring it to said second conveyor means for recombination with said remainder of the separated attached fruit and for collection with the latter at said final collection location; and moving nonselected loose fruit and dirt further along said first conveyor means to a trash discard location.*

*35. The method of claim 34, comprising conveying the separated loose material on said first conveyor means in a direction transverse to the direction of advance along the crop before said removal of loose fruit.*

*36. The method of claim 35, comprising removing selected loose fruit from said first conveyor means while the latter is moving in said transverse direction.*

*37. The method of claim 34, comprising separating loose dirt from the mass before conveying the mass to the loose material separating stage.*

*38. A harvesting machine comprising a frame; means mounting the frame for earth-traversing movement relative to plants such as tomatoes, having fruit attached thereto with fallen loose fruit lying on the ground adjacent the plants; plant-handling means on said frame for gathering a mass of said plants with attached fruit and loose fruit and for feeding said mass along a predetermined path on said frame; a loose mass material separating station along said path comprising means for separating loose fruit as well as clods and other trash from said mass; means for advancing the remaining mass of plants and attached fruit past said loose material separating station toward a shaking station; means for separating attached fruit from the remaining mass at said shaking station; loose material conveyor means mounted on said frame and including a conveyor flight running transversely from below said loose material separating station for carrying loose fruit and trash from said latter station toward a trash discard location; collecting conveyor means mounted on said frame and terminating in a final conveyor flight for collecting and combining both loose fruit and separated attached fruit; detached fruit conveyor means mounted on said frame and including a conveyor flight running below said shaking station for receiving separated attached fruit, said detached fruit conveyor means being arranged to transfer said separated attached fruit to said collecting conveyor means for said collection at said final conveyor flight; a first worker's platform mounted on said frame in a location enabling a worker thereon manually to remove green separated attached fruit from said collecting conveyor means; and means, including a second worker's platform, mounted and located on said frame in a location enabling a worker thereon manually to remove loose fruit traveling on said loose material conveyor means and to transfer it onto said collecting conveyor means for recombination on said final conveyor flight with the remaining separated attached fruit while permitting nonselected loose fruit and trash to be carried by said loose material conveyor means to said trash discard location.*

*39. The harvesting machine of claim 38, comprising means for separating loose dirt gathered with the mass before separating the loose fruit, clods and other trash from the mass.*

References Cited

The following references, cited by the Examiner, are of record in the patented file of this patent or the original patent.

UNITED STATES PATENTS

| | | | |
|---|---|---|---|
| 761,458 | 5/1904 | Dowden | 171—127 |
| 2,559,965 | 7/1951 | Innes | 171—27 X |
| 2,578,189 | 12/1951 | Johnston | 171—121 |
| 2,588,764 | 3/1952 | Richmond | 56—327 |
| 3,070,944 | 1/1963 | Peto et al. | 56—327 |
| 3,078,926 | 2/1963 | Ries et al. | 171—14 |
| 3,199,604 | 8/1965 | Lorenzen et al. | 171—27 |
| 2,010,335 | 8/1935 | Stoltenberg. | |

FOREIGN PATENTS

| | | |
|---|---|---|
| 216,703 | 8/1958 | Australia. |

ANTONIO F. GUIDA, Primary Examiner

U.S. Cl. X.R.

56—327; 171—14

PO-1050
(5/69)

UNITED STATES PATENT OFFICE
CERTIFICATE OF CORRECTION

Patent No. Re 27,528 Dated November 28, 1972

Inventor(s) O. L. LOOKER et al

It is certified that error appears in the above-identified patent and that said Letters Patent are hereby corrected as shown below:

Column 12, line 25, for "[second] third" substitute --third-- (not italicized).

Signed and sealed this 16th day of July 1974.

(SEAL)
Attest:

McCOY M. GIBSON, JR.
Attesting Officer

C. MARSHALL DANN
Commissioner of Patents